April 23, 1957     D. V. GEPPERT     2,790,141
SEMICONDUCTOR MEASURING SYSTEM
Filed Aug. 5, 1953
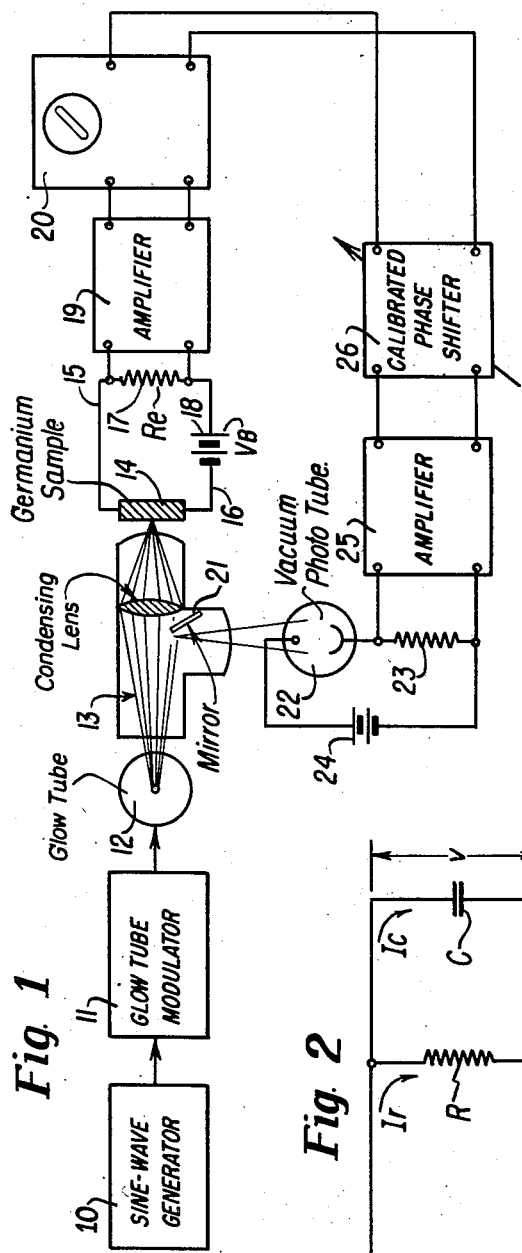
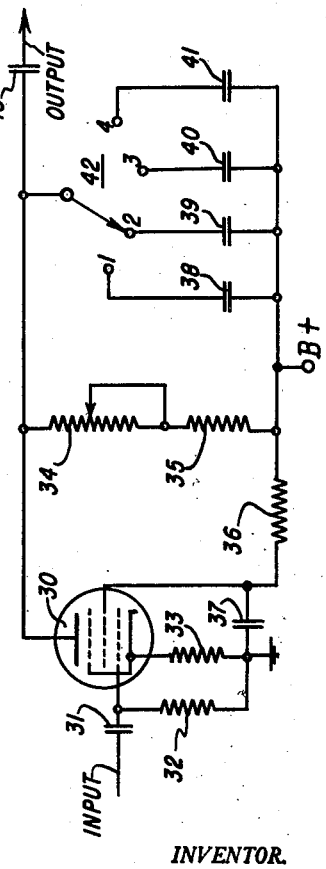
INVENTOR.
Donavan V. Geppert
BY
Foorman L. Mueller Atty.

United States Patent Office

2,790,141
Patented Apr. 23, 1957

2,790,141

SEMICONDUCTOR MEASURING SYSTEM

Donovan V. Geppert, Phoenix, Ariz., assignor to Motorola, Inc., Chicago, Ill., a corporation of Illinois Application August 5, 1953, Serial No. 372,586

8 Claims. (Cl. 324—57)

This invention relates to semi-conductors such as are used in transistors, for example germanium crystals; and more particularly the invention relates to an improved method and apparatus for measuring the mean lifetime of excess minority carriers in such a semi-conductor.

It is well known (see for example "Crystal Rectifiers" by Torrey and Whitmer, vol. 15 of the MIT Radiation Laboratory Series) that electric current can be carried in a semi-conductor by either of two types of carriers, namely, free electrons or holes. An intrinsic semi-conductor has an equal concentration of free electrons and holes, but due to the presence of impurities, either one or the other of these carriers predominates at normal ambient temperatures in semi-conductors incorporated into practical transistor usage. Semi-conductors that have an excess of free electron carriers are termed "N" type, while those with an excess of holes are referred to as "P" type. The particular carriers in any semi-conductor, which have the larger concentration, are known as the "majority" carriers, and the carriers with the smaller concentration are called the "minority" carriers.

Excess minority carriers can be injected into a semi-conductor by a number of methods, such as through a metal point of contact, or through junctions between P and N regions; alternatively hole-electron pairs can be produced by photo excitation. The semi-conductor will tend to preserve electrical neutrality in the presence of such excess carriers so that usually the excess holes and excess electrons therein will have equal concentration.

Immediately after the injection of excess minority carriers, the semi-conductor will tend to restore its previous equilibrium by the recombination of the holes and electrons. The rate at which this recombination occurs is determined by certain characteristic qualities of the piece of semi-conductor, and an indication of the rate of such recombination provides a determination of the suitability of any particular piece of semi-conductor for transistor use. The mean lifetime of the injected minority carriers is an indication of the rate of such recombination and therefore may be used to determine the suitability of any particular piece of semi-conductor for use in a transistor unit.

Several methods have been devised for measuring the lifetime of the excess minority carriers for the purpose discussed above. For example, it has been suggested that this can be achieved by measuring the change in conductance of a semi-conductor sample upon the injection and subsequent decay of excess carriers. It has also been suggested that this measurement can be made by measuring the diffusion length of the excess minority carriers in a semi-conductor sample. These methods have produced satisfactory measurements, but are somewhat difficult to carry out and are time-consuming so that they do not lend themselves readily to routine testing for commercial transistor production.

It is an object of the present invention to provide an improved method and apparatus for measuring quickly, accurately and efficiently the lifetime of excess minority carriers in a semi-conductor sample.

Another object of the present invention is to provide such an improved method and apparatus that is ideally suited to the routine testing of semi-conductor samples during the commercial production of transistor units and the like.

Yet another object of the invention is to provide such improved apparatus for measuring the lifetime of excess minority carriers in a semi-conductor sample that involves relatively few components that may be quickly and conveniently assembled.

A feature of the invention is the provision of a method for measuring the phase lag between the conductance of a semi-conductor sample and a signal producing excess minority carriers in the sample, it having been found that this phase lag is related in a simple function to the lifetime of such excess minority carriers.

Another feature of the invention is the provision of such an improved method in which the excess minority carriers are produced by impinging a modulated light beam on a selected area of the semi-conductor, and in which the phase lag between the conductance of the sample and the modulation of the light beam is measured to obtain an indication of the lifetime of the injected minority carriers.

Yet another feature of the invention is the provision of apparatus which includes means for impinging a modulated light beam on a semi-conductor sample, and means for measuring the phase lag between the conductance of the sample and the modulation of the light beam, thereby to obtain an indication of the lifetime of the excess minority carriers produced in the sample.

A still further feature of the invention is the provision of apparatus which includes means for impinging a modulated light beam on a semi-conductor sample, means for transforming a portion of the modulated light beam into an electrical signal, and means for comparing the phase of such electrical signal with the resulting output signal from the sample to obtain an indication of the lifetime of the excess minority carriers.

Yet another feature of the invention is the provision of apparatus which includes means for impinging a modulated light beam on a semi-conductor sample, means for transforming a portion of the modulated light beam into an electrical signal, and a calibrated adjustable phase shifter for adjusting the phase of the resulting electrical signal to render such signal in phase with the resulting output signal of the sample, the phase shifter being calibrated to provide a direct reading of the lifetime of the excess minority carriers produced in the sample by the modulated light beam.

The above and other features of the invention which are believed to be new are set forth with particularity in the appended claims. The invention itself, however, together with further objects and advantages thereof, may best be understood by reference to the following description when taken in conjunction with the accompanying drawing in which:

Figure 1 shows, in block diagram form, apparatus suitable for carrying out the invention;

Figure 2 is a simplified diagram of a component of the apparatus of Figure 1; and Figure 3 is a more complete circuit diagram of the component of the apparatus shown in simplified form in Figure 2.

The apparatus of Figure 1 includes a variable frequency audio sine wave generator 10 which is coupled to a glow tube modulator 11 which, in turn, is coupled to a glow tube 12.

The light beam from tube 12 is focused by means of a condensing lens system 13 and impinged upon a selected area of a semi-conductor sample 14 which may, for example, be a germanium crystal. A pair of leads 15, 16 is soldered or otherwise suitably attached to the respective ends of sample 14, and these leads are connected together through a load resistor 17 (indicated $R_e$) and a biasing voltage source 18 (indicated $V_B$). The ends of resistor 17 are coupled to an amplifier 19 which, in turn, is coupled to the vertical input of a cathode ray tube oscilloscope 20.

A small mirror 21 is included in the lens system 13 and intercepts a portion of the light beam from tube 12 and directs such portion on a photo-electric device such as a vacuum photo tube 22. The electrodes of the photo tube are connected together through a resistor 23 and an energizing voltage source 24. The ends of resistor 23 are coupled to an amplifier 25 which, in turn, is coupled to the horizontal input of oscilloscope 20 through a calibrated phase shifter 26.

The sine wave signal from generator 10 is applied to modulator 11, and the modulator functions to modulate tube 12 so that the light beam emanating from the tube is sinusoidally modulated. The sinusoidally modulated light beam is focused by lens 13 upon a selected area of the germanium sample 14 and produces excess hole-electron pairs therein. The modulated light beam can be considered an input signal for the germanium sample, and a portion of this input signal is converted into a sine wave electrical signal by vacuum photo tube 22.

The resulting output signal from the germanium sample, due to the excess hole-electron pairs produced therein, appears across load resistor 17 and is amplified in amplifier 19 to produce a deflection for the cathode ray beam in oscilloscope 20 along the vertical axis. The electrical signal produced by photo tube 22 corresponding to the input signal applied to the germanium sample is amplified in amplifier 25 and applied to the oscilloscope through phase shifter 26 to produce a deflection for the cathode ray beam in oscilloscope 20 along the horizontal axis.

The phase shifter 26 is adjusted until the oscilloscope indicates an in-phase condition between the derived sine wave signal and the output signal from the sample which occurs when the normally elliptical pattern on the screen degenerates into a straight line. The phase shifter is calibrated to indicate the amount of adjustment necessary to achieve this in-phase condition. It will be shown that the lifetime of the excess minority carriers is simply related to the phase lag of the output signal with respect to the input signal, and phase shifter 26 may be calibrated to indicate directly such lifetime of the carriers. The light intensity emanating from the glow modulator tube 12 can be written as (1)
$$l = L_0 + L_m \sin wt$$

where $l$ = instantaneous light intensity
$L_0$ = average light intensity
$L_m$ = maximum deviation of light intensity from average value
$w = 2\pi \times$ modulating frequency
$L_0 \geqq L_m$ At the frequencies found suitable in the operation of the present invention, it is found that the modulation component of the light beam intensity is not in phase with the modulating signal applied to the glow tube, inasmuch as the mass of the gas ions in the glow tube causes an increasingly greater phase-lag for increasing frequency. Because the system is basically a phase measuring device, the modulating signal applied to the glow tube cannot be used as a reference signal due to this phase lag in the glow tube itself. Rather, it is preferable that a reference signal be derived directly from the modulated light beam input signal. This is accomplished in the manner discussed previously herein by diverting a small fraction of the light energy into the photo tube 22 which is preferably a high vacuum type, the resulting sine wave electrical signal from the photo tube being in phase with the modulation on the light signal.

The main portion of the light beam from the glow tube 12 passes through the condensing lens system 13 and thence onto the germanium sample, and the image of the light spot from the glow tube appears on a selected area. This image is focused to as small a spot size as possible. The sample may, for convenience, be ¼ centimeter x 1 centimeter x .1 centimeter in size. Leads 15 and 16 are either soldered to the germanium sample or attached to the ends of the sample which are plated or tinned, leads 15 and 16 being soft lead conductors, thereby providing low resistance ohmic contacts to the germanium. The germanium should be properly etched in order to reduce the surface recombination velocity of the excess minority carriers to as low a value as possible.

It can be shown that the number of excess electron-hole pairs N generated in the sample by the modulated light beam represented by Equation 1 is:

(2)
$$N = N_0 + N_m \sin (wt - \phi)$$

where $N_0 = K_1 L_0 \tau$ = average number of excess electron-hole pairs $N_m = K_1 L \dfrac{m}{w} \sin \phi$ = maximum deviation of the number of excess electron-hole pairs from average value $\phi = \tan^{-1} w\tau$ $K_1 = \dfrac{n}{l}$ = constant of proportionality between the instantaneous rate of generation of hole-electron pairs $n$ and the instantaneous light intensity $l$ $\tau$ = mean lifetime of excess minority carriers From Equation 2 it can be shown that the conductance G of the germanium sample is:

(3)
$$G = G_0 + G_m \sin (wt - \phi)$$

where $G_0 = e\dfrac{A}{L}[N_e\mu_e + N_0(\mu_e + \mu_h)]$ = average conductance $G_m = e\dfrac{A}{L}N_m(\mu_e + \mu_h)$ = maximum deviation of conductance from average value $A$ = cross-sectional area of sample
$L$ = length of sample
$e$ = electronic charge
$N_e$ = equilibrium number of electrons in sample
$\mu_e$ = drift mobility of electrons
$\mu_h$ = drift mobility of holes Equation 3 holds for N type germanium wherein the concentration of N type impurities is large compared with the concentration of P type impurities. The assumption is also made that $N_M$ or $N_0$ is much less than $N_e$. In other words, the field distribution inside the germanium sample is essentially unaltered by the excess carriers generated by the light. The additional assumption is also made that a negligible number of excess carriers reach the ohmic connections at the ends of the sample before recombination occurs. In order to validate this last assumption, the operator of the equipment must insure that the voltage drop across the sample (or current through the sample) is relatively low for the particular lifetimes involved. For high lifetime material, an appreciable number of carriers are apt to be swept to the ends of the sample before recombining. The operator must also insure that the sample has sufficient length between the ohmic connections at the ends for the particular lifetimes involved. For high lifetime material, an appreciable number of carriers are apt to diffuse to the ends of the sample before recombining.

Considering diffusion alone, the sample should be several times a mean diffusion length which, for holes in an N type germanium sample is:

(4) $$L_p = \sqrt{D_p \tau}$$

where $D_p$ = diffusion constant for holes
$\tau$ = mean lifetime of holes

For a maximum lifetime of 1000 microseconds, and taking $D_p$ as 43 cm.²/sec. for holes, $L_p$ is about 0.2 cm. Therefore, on the basis of diffusion alone, the sample should be at least one centimeter long.

Considering drift alone, the velocity of holes is related to the field intensity inside the sample by the mobility:

(5) $$\mu_p = \frac{v_p}{\epsilon} = \frac{v_p L}{V} = \frac{L^2}{2 t_p V}$$

where $\mu_p$ = mobility of holes = 1700 cm.²/volt-sec.
$v_p$ = velocity of holes
$\epsilon$ = field intensity
$V$ = voltage drop across sample
$L$ = length of sample
$t_p$ = transit time for holes from center of sample to edge Making $t_p$ several times the longest lifetime of interest and L one centimeter, the allowable voltage V is about 0.1 volt.

As shown in Figure 1, the germanium sample is connected in series with voltage source 18 (designated $V_B$) and a load resistor 17 (designated $R_e$). From Equation 3 it can be shown that the voltage developed across the load resistor is given by the approximate expression (6) $$V = V_0 + V_m \sin(wt - \phi)$$

where $$V_0 = \frac{V_B R_e}{R_e + \frac{1}{G_0}}$$

$$V_m = \frac{V_B R_e G_m}{G_0^2 \left( R_e + \frac{G_0}{1} \right)^2}$$

Equation 6 is accurate provided the relation $G_m \ll G_0$ is valid. It is anticipated that the ratio $$\frac{G_m}{G_0}$$

will be on the order of $10^{-4}$ or $10^{-5}$ so that Equation 6 is a good approximation.

The R. M. S. voltage across $R_e$ is (7) $$V_{rms} = \frac{V_B R_e G_m}{\sqrt{2 G_0^2 \left( R_e + \frac{1}{G_0} \right)^2}}$$

If Equation 7 is maximized with respect to $R_e$ (holding $V_B$ constant) it is found that $V_{rms}$ is a maximum for $$R_e = \frac{1}{G_0}$$

However, Equation 7 can be written in terms of the current through the sample.

(8) $$V_{rms} = \frac{I_0 R_e R_0^2}{\sqrt{2}(R_e + R_0)} G_m$$

where $I_0$ = average current through the sample $R_0 = \dfrac{1}{G_0}$ = average resistance of sample Now if Equation 8 is maximized with respect to $R_e$ (holding $I_0$ constant) it is found that $V_{rms}$ increases asymptotically with $R_e$ to the value $$\frac{1}{\sqrt{2}} I_0 R_0^2 G_m$$

which means that $R_e$ should be large compared to $R_0$. For the case $R_e \gg R_0$, we have approximately (9) $$V_{rms} = \frac{V_0}{\sqrt{2}} \frac{G_m}{G_0}$$

where $V_0 = I_0 R_0$ = average voltage drop across sample

As an example of the order of magnitude of $V_{rms}$ to be expected, assume a case where $V_0 = 1$ volt and $$\frac{G_m}{G_0} = 10^{-4}$$

Using Equation 9, a value of 70.7 microvolts is found for $V_{rms}$. From the above it can be seen that amplifier 19 of Figure 1 should be a high gain low noise amplifier having a low phase shift over the desired frequency range.

The purpose of phase shifter 26 of Figure 1, as previously noted, is to shift the phase of the signal from photo tube 22 (which is in phase with the modulation on the light beam) so that the relative phase shift between the output signal from the germanium sample and the output signal from the phase shifter can be made zero, this being conveniently determined by oscilloscope 20. The phase shift can be easily accomplished by a simple resistance-capacitance circuit such as shown in Figure 2. The source is assumed to be a constant current generator. It can be shown that the alternating voltage developed across capacitor C is

(10) $$V = \left[ \frac{I_m}{wc} \sin \phi \right] \sin(wt - \phi)$$

where $\phi = \tan^{-1} wRC$

The similarity between Equation 10 and the alternating component of Equation 2 should be noted. In particular, the amplitude of both quantities is inversely proportional to frequency and proportional to sine $\phi$. The phase angle in Equation 2 is $\tan^{-1} w\tau$ where $\tau$ is the mean minority carrier lifetime, and the phase angle in Equation 10 is $\tan^{-1} w\tau$ where $\tau$ is the time constant of the RC circuit. Thus by adjusting the RC product until zero relative phase is detected on the screen of oscilloscope 20, the lifetime can be read directly from the calibrated R and C dials.

It is evident that the outputs of amplifiers 19 and 25 could be applied directly to a phase meter calibrated in lifetime to provide desired indication, rather than the illustrated system in which the output from amplifier 25 is phase shifted a certain calibrated amount to bring that signal into phase with the signal from amplifier 19.

Details of a constructed embodiment of the last stage of amplifier 25 and phase shifter 26 are shown in Figure 3. The amplifier includes an electron discharge device 30, which, in order to approximate a constant-current generator as previously stated, is preferably a pentode. The signal across resistor 23, after having been amplified if necessary by a suitable pre-amplifier, is impressed through a coupling capacitor 31 on the control electrode of device 30, the control electrode being connected to ground through a grid resistor 32. The cathode of device 30 is connected to ground through a cathode resistor 33 and the anode of the device is connected to the positive terminal B+ of a uni-directional potential source through a variable resistor 34 and a series-connected resistor 35. The screen electrode of the device is connected to the positive terminal B+ through a screen resistor 36 and is by-passed to ground through a capacitor 37. As indicated in the drawing by way of example, device 30 may be of the type presently designated as a 6AK5, resistor 34 may be of a value of 10 kilo-ohms, and resistor 35 may have a value of 2.7 kilo-ohms.

Resistors 34 and 35 form a portion of the calibrated phase shifter 26 and the phase shifter includes a series of capacitors 38—41 which may be selectively connected across the resistors by means of a switching device 42. The anode of device 30 is connected to the common arm of switching device 42 and through a coupling capacitor 43 to an output terminal which, as shown in Figure 1, is connected to oscilloscope 20.

In the illustrated embodiment, capacitors 38—41 may, for example, have respective values of .003, .01, .03 and .1 microfarad.

A dial is provided for the variable resistor 34 and may be calibrated directly in lifetime on four overlapping scales. A range of lifetimes from 8.1–1270 micro-seconds, for example, may be provided for in this manner for the various settings of switch 42 in accordance with the following table. This table also shows recommended values for the frequency setting to be used on the variable frequency audio sine wave generator 10 in order to keep the phase shift in the germanium sample within a desirable range of values, or from about 17 to about 51 degrees.

| Switch Position | Frequency, C. P. S. | Range, Micro-seconds |
| --- | --- | --- |
| 1 | 6,000 | 8.1–38.1 |
| 2 | 2,000 | 27.0–127.0 |
| 3 | 600 | 81–381 |
| 4 | 200 | 270–1,270 |

In the illustrated embodiment of the invention, the minority carriers are injected into the sample by photo excitation. However, such carriers may also be injected by metal point contact. When the latter type of injection is used, the sine wave signal from generator 10 may be impressed directly on a point contact electrode of the crystal, and the sine wave signal may also be directly impressed on amplifier 25.

The invention provides, therefore, relatively simple apparatus by means of which the mean lifetime of excess minority carriers in a semi-conductor sample may be measured in a simple, expeditious and convenient manner. The apparatus has been found to be exceedingly accurate and lends itself readily for routine testing of germanium samples during the commercial fabrication of transistor units.

While a particular embodiment of the invention has been shown and described, modifications may be made and it is intended in the appended claims to cover all such modifications as fall within the true spirit and scope of the invention.

I claim:

1. A method for measuring the lifetime of excess minority carriers in a semi-conductor which comprises, providing a sample of the semi-conductor, establishing an indication of the electrical conductance of said sample between points on the sample spaced apart a distance several times greater than the mean diffusion length of minority carriers in the sample, impressing a signal on said sample to inject excess carriers therein thereby to vary the electrical conductance of the sample, and utilizing the phase differential between such variation in the electrical conductance of the sample and the impressed signal to determine the lifetime of excess minority carriers in said sample.

2. A method for measuring the lifetime of excess minority carriers in a semi-conductor which comprises, providing a sample of the semi-conductor, establishing an indication of the electrical conductance of said sample between points on the sample spaced apart a distance several times the mean diffusion length of minority carriers in the sample, impressing an amplitude-varying signal on said sample to inject excess carriers therein thereby to vary the electrical conductance of the sample, and utilizing the phase differential between such variation in the electrical conductance of the sample and the amplitude-varying signal impressed thereon to determine the lifetime of excess minority carriers in said sample.

3. A method for measuring the lifetime of excess minority carriers in a semi-conductor which comprises, providing a sample of the semi-conductor of at least one centimeter length, providing a pair of low resistance ohmic contacts on opposite ends of said sample, impressing a biasing voltage across the contacts to provide an indication of the electrical conductance of said sample, said bias voltage being not greater than about 0.1 volt multiplied by the square of the length of the sample in centimeters impressing a signal on said sample to inject excess carriers therein thereby to vary the electrical conductance of the sample, and utilizing the phase differential between such variation in the electrical conductance of the sample and the impressed signal to determine the lifetime of excess minority carriers in said sample.

4. A method for measuring the lifetime of excess minority carriers in a semi-conductor which comprises, providing a sample of the semi-conductor of a length several times greater than mean diffusion length of minority carriers in the sample, providing a pair of low resistance contacts on opposite ends of said sample, impressing a biasing voltage across the contacts to provide an indication of the electrical conductance of said sample, impressing a signal on said sample to inject excess carriers therein thereby to vary the electrical conductance of the sample, deriving a portion of the impressed signal, shifting the phase of the derived portion of the impressed signal to render such portion in phase with variations in the conductance of said sample due to the impressed signal, and measuring the phase shift necessary to render said derived portion of the impressed signal in phase with such variations in the conductance of the sample to determine the lifetime of excess minority carriers in said sample.

5. A method for measuring the lifetime of excess minority carriers in a semi-conductor which comprises, providing a sample of the semi-conductor, establishing an indication of the electrical conductance of said sample between points on the sample several times greater than the mean diffusion length of minority carriers in the sample, projecting an amplitude modulated light beam onto a selected area of the sample to inject excess carriers therein thereby to vary the electrical conductance of said sample, deriving an electrical signal from said modulated light beam, and utilizing the phase differential between such variation in the electrical conductance of the sample and the derived signal to determine the lifetime of excess minority carriers in said sample.

6. A method for measuring the lifetime of excess minority carriers in a semi-conductor which comprises, providing a sample of the semi-conductor, establishing an indication of the electrical conductance of said sample between points on the sample spaced apart a distance at least several times as great as the mean diffusion length of minority carriers in the sample, projecting a sinusoidally modulated light beam onto a selected area of said sample to inject excess carriers therein thereby to vary the electrical conductance of said sample, deriving an electrical conductance of said sample, deriving an electrical sine wave signal from said modulated light beam, shifting the phase of the derived sine wave signal to render the derived signal in phase with variations in the conductance of said sample due to the impressed signal, and measuring the phase shift necessary to render said derived signal in phase with such variations in the conductance of the sample to determine the lifetime of excess minority carriers in said sample.

7. Apparatus for measuring the lifetime of excess minority carriers in a semi-conductor including in combination, serially-connected load resistor means and unidirectional bias voltage means, means for connecting said serially-connected means in low resistance contact across a sample of the semi-conductor to establish a voltage across said resistor means having a value corresponding to the electrical conductance of the sample, means for impressing a signal on the sample to inject excess carriers therein thereby to vary the electrical conductance of the sample, and means coupled to said signal-impressing means and to said resistor means for utilizing the phase differential between such variation in the electrical conductance of the sample and the impressed signal to determine the lifetime of excess minority carriers in the sample.

8. Apparatus for measuring the lifetime of excess minority carriers in a semi-conductor including in combination, serially-connected load resistor means and unidirectional bias voltage means, means for connecting said serially-connected means in low resistance contact across a sample of the semi-conductor to establish a voltage across said resistor means having a value corresponding to the electrical conductance of the sample, means for impinging a sinusoidally modulated light beam on a selected area of the sample to inject excess carriers therein thereby to vary the electrical conductance of the sample, a network including a photo-electric device for deriving an electrical sine wave signal from said modulated light beam, indicating means coupled to said resistor means and to said network for indicating the phase relation between such variations in the electrical conductance of the sample and said sine wave signal, and a calibrated adjustable phase shifting circuit included in said network to render said sine wave signal in phase with such variations in electrical conductance.

References Cited in the file of this patent
UNITED STATES PATENTS

| | | |
|---|---|---|
| 2,556,296 | Rack | June 12, 1951 |
| 2,595,263 | Ingalls | May 6, 1952 |
| 2,618,686 | Lange | Nov. 18, 1952 |